United States Patent
Tsunobuchi et al.

(10) Patent No.: US 6,978,938 B2
(45) Date of Patent: Dec. 27, 2005

(54) OPTICAL INFORMATION READER AND OPTICAL INFORMATION READING METHOD

(75) Inventors: Hirokazu Tsunobuchi, Osaka (JP); Hideki Hashimoto, Osaka (JP)

(73) Assignee: Keyence Corporation, Osaka (JP)

( * ) Notice: Subject to any disclaimer, the term of this patent is extended or adjusted under 35 U.S.C. 154(b) by 0 days.

(21) Appl. No.: 10/784,379

(22) Filed: Feb. 23, 2004

(65) Prior Publication Data

US 2004/0164157 A1    Aug. 26, 2004

Related U.S. Application Data

(63) Continuation of application No. 10/162,853, filed on Jun. 5, 2002, now abandoned.

(30) Foreign Application Priority Data

Jun. 7, 2001 (JP) .......................... P.2001-173272
May 29, 2002 (JP) .......................... P.2002-156410

(51) Int. Cl.⁷ .......................................... G02B 26/10
(52) U.S. Cl. ............................. 235/462.25; 235/462.15
(58) Field of Search ................. 235/462.07, 462.15, 235/462.25, 462.48, 454, 462.18, 472.01, 235/472.02

(56) References Cited

U.S. PATENT DOCUMENTS

| | | | |
|---|---|---|---|
| 4,825,058 A | 4/1989 | Poland | 235/462.01 |
| 5,120,943 A | 6/1992 | Benz | 235/375 |
| 5,345,605 A | 9/1994 | Motegi | 340/7.42 |
| 5,563,402 A | 10/1996 | Reddersen et al. | 235/436 |
| 5,701,588 A | 12/1997 | Morita et al. | 340/7.56 |
| 5,780,831 A | 7/1998 | Seo et al. | 235/462.1 |
| 5,850,212 A * | 12/1998 | Nishibori | 345/160 |
| 5,900,613 A * | 5/1999 | Koziol et al. | 235/462.15 |
| 5,929,418 A | 7/1999 | Ehrhart et al. | 235/462.27 |
| 5,932,862 A * | 8/1999 | Hussey et al. | 235/462.07 |
| 5,992,744 A * | 11/1999 | Smith et al. | 235/462.11 |
| 6,286,762 B1 * | 9/2001 | Reynolds et al. | 235/472.01 |
| 6,318,636 B1 | 11/2001 | Reynolds et al. | 235/472.01 |
| 6,505,778 B1 | 1/2003 | Reddersen et al. | 235/462.25 |
| 6,578,766 B1 | 6/2003 | Parker et al. | 235/462.01 |

FOREIGN PATENT DOCUMENTS

WO    WO 9507000 A1 *    3/1995    .......... H04N 5/262

* cited by examiner

*Primary Examiner*—Diane I. Lee

*Assistant Examiner*—Kumiko C. Koyama

(74) *Attorney, Agent, or Firm*—Kilyk & Bowersox, P.L.L.C.

(57) ABSTRACT

A tabletop type optical information reader has a projection unit, a trigger unit, a decode unit, a data processing unit, a memory unit, and a switch unit. The projection unit projects light to a read object. The trigger unit instructs the projection unit for projecting light. The decode unit receives reflected light from the read object and decodes information contained in the read object. The data processing unit processes the decoded data provided by the decode unit. The memory unit stores at least one function that can be set in the optical information reader. The switch unit calls the function to be set.

29 Claims, 9 Drawing Sheets

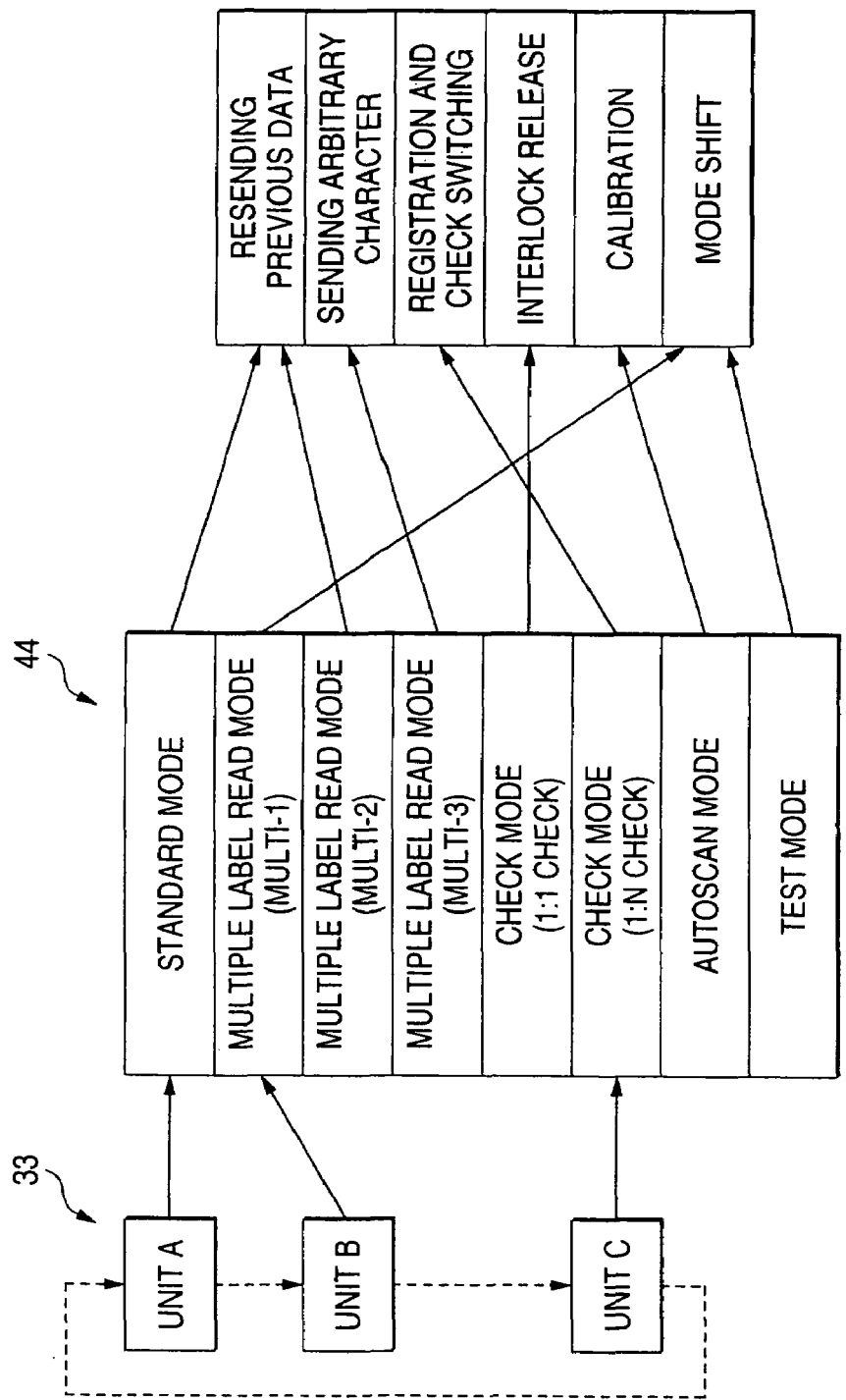

FIG. 9

| OPERATION MODE / OPERATION FUNCTION | STANDARD MODE | MULTIPLE LABEL READ MODE (MULTI-1) | MULTIPLE LABEL READ MODE (MULTI-2) | MULTIPLE LABEL READ MODE (MULTI-3) | CHECK MODE (1:1 CHECK) | CHECK MODE (1:N CHECK) | AUTOSCAN MODE | TEST MODE |
|---|---|---|---|---|---|---|---|---|
| RESENDING PREVIOUS SCAN DATA | ○ | × | ○ | ○ | × | × | × | × |
| SENDING SETUP ARBITRARY CHARACTER | ○ | × | ○ | ○ | × | × | × | × |
| REGISTRATION AND CHECK SWITCHING | × | × | × | × | × | ○ | × | × |
| INTERLOCK RELEASE | × | × | × | × | ○ | ○ | × | × |
| CALIBRATION | ○ | ○ | ○ | ○ | × | × | ○ | × |
| MODE SHIFT | ○ | ○ | ○ | ○ | ○ | ○ | ○ | ○ |

OPTICAL INFORMATION READER AND OPTICAL INFORMATION READING METHOD

This application is a continuation patent application of U.S. patent application Ser. No. 10/162,853 filed Jun. 5, 2002 now abandoned.

BACKGROUND OF THE INVENTION

1. Field of the Invention

The present invention relates to an optical information reader and an optical information reading method. For example, the present invention is used for a tabletop type or hand-held type bar code reader comprising a switch to which any of a plurality of functions can be assigned.

2. Description of the Related Art

Nowadays, a bar code is used in application of identify a commodity code, etc. The bar code comprises contiguous lines different in width so that it can represent alphanumerics by bar and blank portions. The bar code, for example, represents a universal product code. To read such a bar code, a bar code scanning device is used as an optical information reader. The bar code scanning device generally is called a bar code reader, a bar code scanner, etc.

The bar code scanning device generally comprises a configuration as shown in FIG. 6. The bar code scanning device shown in FIG. 6 comprises a bar code read section 1 and a signal processing circuit 2. The bar code scanning device scans a bar code label 3 with a bar code printed through the bar code read section 1, detects reflected light, and reads information of the bar code by the signal processing circuit 2.

In FIG. 6, a laser projection circuit 4 projects light such as laser light to a galvanometer mirror 5 and reflected light on the galvanometer mirror 5 is scanned over the bar code. The bar and blank (monochrome) portions making up the bar code differ in reflectivity. The blank portion provides a large reflected light amount. The bar portion provides a small reflected light amount. The reflected lights are gathered on a light gathering mirror 6 through the galvanometer mirror 5. The gathered reflected lights are taken out as an analog signal in time series through a band-pass filter 7 and a photodiode serving as a light reception element 8. The analog signal is sent to the signal processing circuit 2.

The signal processing circuit 2 has a light reception circuit 9, an AC coupling circuit 14, an amplification circuit 10, a filter circuit 11, a binarization circuit 12, and a decode circuit 13. The light reception circuit 9 receives a signal from the bar code read section 1. The AC coupling circuit 14 allows the AC component of output of the light reception circuit 9 to pass through. The amplification circuit 10 amplifies the output signal of the AC component provided by the AC coupling circuit 14. The filter circuit 11 filters the amplified signal. The binarization circuit 12 binaries the filtered signal. The decode circuit 13 decodes the information recorded on the bar code. The decode circuit 13 generally is implemented as a CPU, etc. The digital signal binarized by the binarization circuit 12 is sent to the CPU, which then decodes the signal by a program according to an algorism.

The bar code readers generally can be classified into fixed-type, handy terminal type, and tabletop type according to the shape of the bar code reader.

[Fixed-type Bar Code Reader]

The fixed-type bar code reader is used with a factory production line, in a machine, etc. It is disposed on a side of a conveyor, a wall, or the like for use so that the read area of the bar code reader is aimed at a bar code put on a transported object on the production line. The bar code reader portion of this type has a function of decoding bar code information and transmitting the decoded data to a host computer. In other words, processing for the decoded data generally is performed in the host computer and the bar code reader portion does not have such a function.

[Handy Terminal Type Bar Code Reader]

The handy terminal type bar code reader is used for commodity management, inspection, etc., in a warehouse. It is assumed that the user carries the handy terminal type bar code reader and uses it in the field. Thus, the handy terminal type is convenient for carrying and further the terminal itself comprises a processing function of a commodity management program, etc., responsive to the use purpose. That is, unlike the fixed-type bar code reader, the handy terminal type bar code reader completes operation solely.

[Tabletop Type Bar Code Reader]

The tabletop type bar code reader is used for POS management, etc., at a checkout counter of a convenience store. The bar code reader of this type transmits the data to a host computer. Since the bar code reader is shaped like a gun, it is sometimes called a gun-type bar code reader. Like the handy terminal type bar code reader, the tabletop type bar code reader also has a compact shape easily handled by the user. The handy terminal type and tabletop type bar code readers differ in that the handy terminal type bar code reader completes operation solely; whereas the tabletop type bar code reader operates in conjunction with the host computer. The read portion of the tabletop type bar code reader generally has only a function of decoding a bar code. That is, it can also be grasped as a handy terminal type bar code reader comprising the read portion of the fixed-type bar code reader.

The appearance of the tabletop type bar code reader is, for example, as shown in FIGS. 7A–C. The tabletop type bar code reader is provided with a trigger switch 17. Generally, a laser is projected while the trigger switch 17 is turned on. The user projects a laser to the target bar code label by operating the trigger switch 17 and reflected light is read into the bar code reader. In addition to the trigger switch, the tabletop type bar code reader is sometimes provided with a switch to which a specific function is assigned.

However, the tabletop type bar code reader in the related art has a switch to which a specific function is previously assigned, and the user cannot assign any desired function to the switch. For example, the tabletop type bar code reader shown in FIGS. 7A–C is provided with switches in addition to the trigger switch 17, but predetermined functions are previously fixed to the switches and cannot be changed to any desired function by the user.

On the other hand, in recent years, because of an increase in demand for bar codes, making a bar code reader multi-function has also been required. In response to this, various functions are added to the bar code reader, but the operation of each function becomes complicated and usability is impaired. If the user needs to execute a plurality of steps to call a function, he or she interrupts the work and needs to check the procedure on the manual or keep the procedure in mind; this is a cumbersome task. To facilitate calling a function, a plurality of switches can be provided in a one-to-one correspondence with the functions; however, in doing so, the number of the switches is increased, resulting in a rise in manufacturing costs. Further, as the number of the switches is increased, the user confuses the switches and may operate the switches erroneously, the operability being worsened. If the bar code reader is made multifunctional, only some of the functions which are required for each user can be assigned to the switches; however, the frequently used functions or the functions to be easily called are limited.

Essentially, the required functions vary depending on the use state of the bar code reader and the use mode of the user. The manufacturer of the bar code reader previously assigns the seemingly frequently used functions to switches, but it is impossible to estimate diverse use modes and completely cover the use modes. If it is made possible for the user to specify and change function assignments to the switches as desired, an ease-of-use environment as setting responsive to the use mode can be provided for the user.

SUMMARY OF THE INVENTION

The invention has been developed to meet such needs of the user. It is a main object of the invention to provide an optical information reader comprising a switch to which the user can assign any desired function and an optical information reading method.

In order to accomplish the object above, the following means are adopted. According to the present invention, there is provided an optical information reader of a tabletop type. The optical information reader comprises a projection unit for projecting light to a read object, a trigger unit for instructing the projection unit for projecting light, a decode unit for receiving reflected light from the read object and decoding information contained in the read object, a memory unit for storing at least one preset function that can be set in the optical information reader, a switch unit for calling the function to be set from the memory unit, and a data processing unit for performing processing corresponding to the function to be set called by the switch unit. The data processing unit may process the decoded data provided by the decode unit on the basis of the processing corresponding to the function to be set.

The optical information reader can be provided with at least one switch for calling the function that can be executed by the optical information reader as the switch unit aside from a trigger switch for operating the trigger unit, etc. The function assigned to the switch can be changed as desired by the user. Stored function setting can be changed to any desired setting by reading a setting read object, for example.

In the optical information reader, it is preferable that the stored function in the memory unit is at least one operation mode for determining an operation state of the optical information reader.

In the optical information reader, a plurality of operation modes are preset and one of them can be called whenever necessary.

Further, in the optical information reader, it is preferable that each of the operation modes as the functions can be set are selectable operation functions in the memory unit and the selected operation function is executed by the switch unit.

With the optical information reader, from among a plurality of operation functions, a different operation function cane assigned corresponding to each operation mode and the assigned operation function can be changed in response to the used operation mode.

Moreover, in the optical information reader, it is also preferable that the switch unit can distinguish the execution of the set operation function from transition of said operation mode.

For example, operation mode transition and operation function execution can be distinguished from each other in response to the ON time of the switch unit.

Further, to achieve the object of the present invention, there is provided an optical information reading method using an optical information reader. The optical information reading method comprises selecting at least one function that can be set in the optical information reader and storing the selected function in a memory unit, projecting light to a read object from a projection unit in response to an instruction of a trigger unit, receiving reflected light from the read object and decoding information contained in the read object, calling the function to be set from the memory unit by a switch unit, and performing processing corresponding to the function to be set called by the switch unit. The decoded data is processed on the basis of the processing corresponding to the function to be set.

BRIEF DESCRIPTION OF THE DRAWINGS

FIG. 8 is a schematic diagram to show one preferred memory unit shown in FIG. 1; and FIG. 9 is a comparison table to show selectable operation functions relationship with each of all operation modes.

DETAILED DESCRIPTION OF THE INVENTION

Referring now to the accompanying drawings, there are shown preferred embodiments of the invention. However, the embodiments described later exemplify optical information readers for embodying the technical thought of the invention and the invention is not limited to the optical information readers described later. The members as defined in claims are not limited to the members of the embodiments. The size of each member, the positioning relationship, and the like shown on the accompanying drawings may be exaggerated for purposes of illustration.

In the following embodiments, an example of applying to a bar code scanning device will be discussed as an example of embodying an optical information reader of the invention. However, the embodiments of the invention are not limited to bar code scanning devices. For example, the embodiments can also be used for an OCR (Optical Character Reader), etc., for recognizing two-dimensional code and text. The term "bar code" in this specification is used to mean not only a one-dimensional bar code, but also a two-dimensional code (data symbol).

Figure 1:
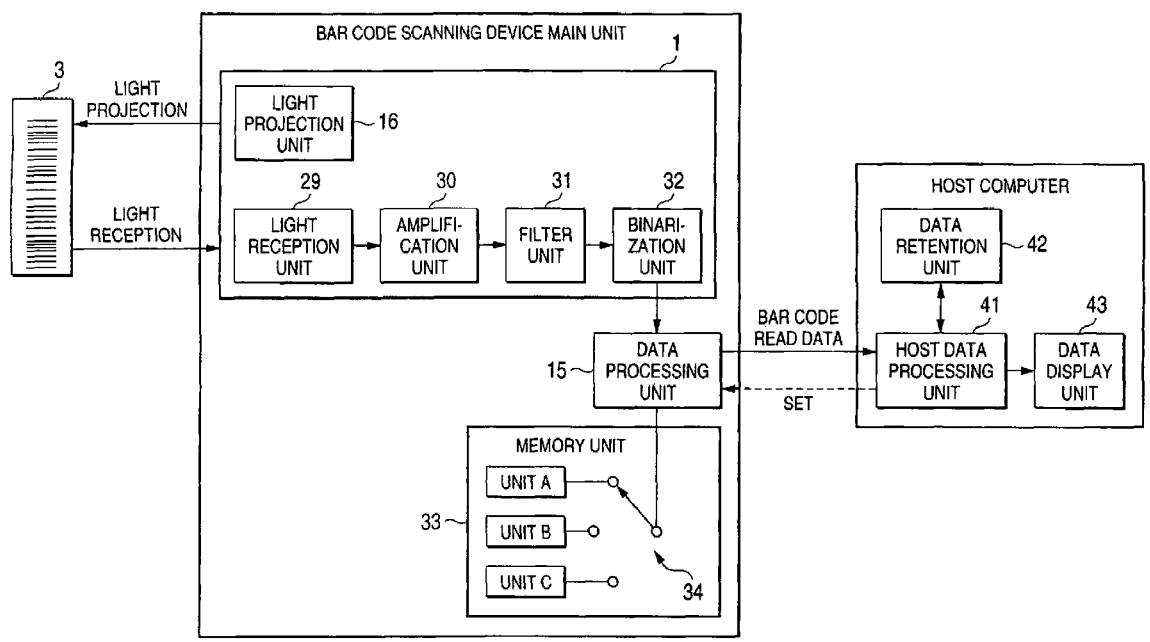
FIG. 1 is a block diagram to show the configuration of a tabletop type bar code scanning device according to an embodiment of the invention.

FIG. 1 is a block diagram to show a configuration example of a tabletop type bar code scanning device according to the present invention. The bar code scanning device main unit shown in FIG. 1 comprises a bar code read section 1 and a data processing unit 15. The bar code read section 1 comprises a light projection unit 16, a light reception unit 29, an amplification unit 30, a filter unit 31, and a binarization unit 32. The light projection unit 16 projects light to a bar code label 3 to be read. The light reception unit 29 receives reflected light from the bar code label. The amplification unit 30 amplifies an electric signal provided by the light reception unit 29. The filter unit 31 cuts an unnecessary signal such as high-frequency noise from the amplified signal provided by the amplification unit 30. The binarization unit 32 converts (binarizes) the analog signal provided from the filter unit 31 into a digital signal. The data processing unit 15 performs necessary processing for the digital signal output from the binarization unit 32. The date processing unit 15 performs, for example, decoding the binarized data, processing corresponding to the desired function preset by the user as described below, etc.

The bar code scanning device main unit is connected to a host computer in a state in which data communications with the host computer can be conducted. The bar code scanning device transmits the decoded data to the host computer. The data communications may be one-way communications of transmitting data from the bar code scanning device main unit to the host computer. However, as two-way communications, setting change and operation instructions may also be transmitted from the host computer to the bar code scanning device main unit. The host computer comprises a host data processing unit 41, a data retention unit 42, and a data display unit 43. The host data processing unit 41 receives data from the bar code scanning device main unit and conducts data communications with the bar code scanning device main unit as required. The data retention unit 42 retains the processed data. The data display unit 43 displays the data on the outside.

The bar code scanning device main unit further comprises a memory unit 33 connected to the data processing unit 15 and a switch unit 34. The memory unit 33 causes the data processing unit 15 to perform various types of processing. The memory unit 33 stores several functions that the user desires the bar code scanning device main unit to execute or several processing required for providing the functions. The functions or the processing are switched by the switch unit 34. Each of the above-mentioned functions is each of operation modes described the below according with FIG. 9. The user presets any desired function in the bar code scanning device main unit. Further, each of operational functions is set to each of the operation modes. The function or the necessary processing corresponding to the function preset by the user is retained in the memory unit 33. In the example in FIG. 1, the setup operation modes by the user are retained in a unit A, a unit B, and a unit C. As the user operates a function switch 25 (shown in FIG. 7), the switch unit 34 is switched for sending a command stored in the memory unit 33 to the data processing unit 15. The necessary processing is executed in response to the command and the setup function is provided. Further, an operation function will be described the below, which is provided corresponding to each of the operation modes. In case shown in FIG. 1, the unit A, unit B and unit C store the selected operation modes respectively. The user selects desired three operation modes from all of the operation modes and each of the selected three operation modes is provided to the unit A, unit B and unit C respectively by the selecting. Further, each of the selected modes stored in the unit A, unit B and unit C is provided each of desired operation functions. Thus, the desired operation functions is stored into the memory unit 33 with linkage with the selected operation modes. The operation mode stored into the memory unit 33 is switched to the other mode by the switch unit 34. Further, the switch unit 34 also has other function to read out the selected operation function corresponding to the selected operation mode. Thus, the switch unit 34 has two kinds roles as switching from one operation mode to the other operation mode and executing the selected operation function corresponding to the selected operation mode. Besides the trigger switch 17, to provide the switch unit 34 can be easily read out the user desired operation mode and operation function to be set up into each of the unit A, unit B and unit C from all of operation modes and operation functions stored into the memory unit 33. Further, since two or more operations modes are set up and each set up mode has desired operation function, the user can use the bar code scanning device main unit with the desired operation mode and operation function.

In the embodiment, the processing is performed for the binarized data provided by the binarization unit 32. In the invention, however, the specified function can also contain processing for data before being binarized or decoded. The invention can also be applied to processing for a digitized signal, processing in the process of being digitized, or processing at the preceding stage of being digitized.

The figure is a schematic drawing and various types of processing, instructions, and functions need not necessarily be switched by hardware for connection. They may be provided by software processing in memory. For example, the memory unit 33 may retain user-specified functions or processing for providing each of the functions as a operation table and a operation mode corresponding to a necessary function may be called into the unit A, unit B and unit C in response to setting.

For example, the memory unit 33 comprises ROM or $E^2PROM$ or the like. The memory unit 33 memorizes each operation mode with reference table to decide which operation mode has the relationship to each of the unit A, unit B and unit C. As the other function of the memory unit 33, the memory unit 33 can memorize the contents of the operation modes or the processing contents to execute the operation modes. Further, it is also preferred that the memory unit 33 has a memory part storing the operation modes and another memory part storing the operation functions corresponding to the operation modes separately. The memory unit 33 is shown in FIG. 8. In an example shown in FIG. 8, each of the unit A, unit B and unit C retains the selected operation mode or refers based on a table 44 and further each selected operation mode has several selectable operation functions. The table 44 comprises a memory element like ROM to store the selectable operation modes and the selectable operation functions corresponding to the selectable operation mode. An example of combination between each operation mode and operation function is shown in FIG. 9. The above mentioned combination between the operation modes and functions is memorized into the table 44. Each of the unit A, unit B and unit C is setup each of the selected operation modes with referring to the table 44 and further each selected operation mode is provided the selected operation function. Since the unit A, unit B and unit C comprises a memory element like E2PROM, the unit A, unit B and unit C retain a position or address storing the selected function, in other words, the selected operation mode. When the selected modes is carried out by using the switch unit 34, the selected unit A, unit B or unit C refers to the table 44 and the selected operation mode corresponding to the selected unit is read out by the switching the switch unit 34. Since each of the selected operation modes has the selected operation function by the user or a standard operation function if the user does not select the specified operation function, the operation function is carried out corresponding to the selected operation mode. Thus, as solid arrow line shown in FIG. 8, the operation mode setup the selected unit A, B or C and the selected operation function corresponding to the selected operation mode are carried out. On the other hand, when the switching of the operation modes is carried out by the function switch, the selected unit is changed to unit A, B and C in turn and the selected operation mode corresponding to the selected unit is carried out.

In case shown in FIG. 8, the unit A retains an operation mode A, the unit B retains an operation mode B and the unit C retains an operation mode C. However, the combination between the unit and operation mode as described to the above are not limited to the other type of combination between the unit and operation mode. Further, it is also preferred that the number of the units is increased or decreased. In the above mentioned case, the switching of the units A, B and C is carried out in turn like toggle. However, the switching turn can be done without the restriction as the other method. Furthermore, since each operation mode is independent, the operation functions corresponding to each operation mode can be overlap between the selectable operation modes.

As shown in FIG. 9, as an example of the above mentioned system, the memory unit 33 of the bar code scanning device main unit memorizes "Standard mode", "Multiple label read mode(Multi-1)", "Multiple label read mode (Multi-2)", "Multiple label read mode(Multi-3)", "Check mode (1:1 check)", "Check mode (1:N check)", "Autoscan mode" and "Test mode" as described to the below in a detail which are desired and selectable several basic reading functions corresponding to the bar code reading by the user. The desired and selectable several basic reading functions are several operation modes and test mode. Desired operation modes from the above all operation and test modes are selected by the user and the desired and selected modes are retained into the unit A, B and C respectively. There are several kinds of embodiments to be retained the operation modes to the unit. For example, one preferred embodiment is that prepared bar codes for selecting the operation modes, starting the setup of the operation modes and completing the setup of the operation modes are read out by the bar code scanning device. In detail, the bar codes corresponding to starting for setup the operation modes, the selected operation mode to be memorized into the unit A, the selected operation mode to be memorized into the unit B, the selected operation mode to be memorized into the unit C and completing for setup the operation modes in turn are read out by the bar code scanning device. On the other hand, the other preferred embodiment is that a prepared software for setting the operation modes and installed into a computer like a personal computer is used by the user to select the operation modes for the units A, B and C. Then after the user selects the operation modes for the unit A, B and C, the selected information of the operation modes are sent from the computer to the bar code scanning device main unit to be setup the selected operation modes to the units A, B and C. Further, as shown in FIG. 9, the memory unit 33 of the bar code scanning device main unit memorizes "Resending the previous scan data", "Sending a setup arbitrary character scanning", "Registration and check switching", "Interlock release", "Calibration" and "Mode shift" as described to the below in a detail which are desired and selectable several operation functions corresponding to the operation modes.

Each of these operation functions can be operated corresponding to each of the operation modes except "Mode shift" function. Therefore, there are several kinds of the setup method of these operation functions. For example, one preferred embodiment is that the selectable operation functions corresponding the selected operation modes set up in the unit A, B and C can be selected "ON condition" or "OFF condition" on a display unit of the computer like a personal computer. On the other hand, the other preferred embodiment is that prepared bar codes for starting the setup of the operation functions, selecting "ON condition" or "OFF condition " of the operation functions and completing the setup of the operation functions are read out by the bar code scanning device in turn. Further, when the a part of operation functions is corresponding to several operation modes (for example, refer to "Standard mode", "Multiple label read mode (Multi-2)" and "Multiple label read mode (Multi-3)" shown in FIG. 9), it is prepared bar codes for setting the desired operation functions corresponding to these operation modes having a common selectable operation functions and it is easy and simply to set up the desired operation functions corresponding to the operation modes having the common selectable operation functions except un-selectable operation functions by scanning the bar codes related to the selectable operation functions only. As it is descried to the above, there are several kinds of setup methods of the operation modes and functions. However, there is a method except the above described method to setup the operation modes and functions can be useful to memorize the operation modes and functions in the present invention.

A bar code comprises an alternating pattern of bars of black, etc., which is low in reflectivity and blank portions of white, etc., which has no print and is high in reflectivity for recording any desired information consisting of alphanumerics, etc. The bar code is used in a state in which the bar code label 3 comprising the bar code printed on a seal, etc., is put on the object or in a state in which the bar code is printed directly on the object. A light beam of laser light, etc., is scanned over the bar code and reflected light is detected by the light reception element of the light reception section, whereby the bar and space widths of the bar code are measured. Then the analog signal provided from the light reception section is decoded, whereby the information encoded in the bar code is read.

In the bar code scanning device main unit shown in FIG. 1, a signal read through the bar code read section 1 is binarizes and the binarized signal is sent to the data processing unit 15. The data processing unit 15 also serves as decode unit. The data processing unit 15 performs necessary processing, such as decoding binarized data, etc., and sends the decoded data to the external host computer. In the bar code read section 1, laser light projected from the projection unit 16 and reflected on a bar code is gathered, only the light having a desired band is allowed to pass through and is received on the light reception element. Then, a voltage signal responsive to the light reception amount is generated, and the voltage signal is binarized by the binarization unit 32 to provide a binarized signal.

The light reception unit 29 receives reflected light of laser light projected to and scanned over the bar code label 3 by the light projection unit 16. The received reflected light has the light amount responsive to light and shade of the bar code label 3. The light reception unit 29 outputs a voltage signal responsive to the light reception amount. For example, in a light blank portion, a high voltage signal is provided and in a dark bar portion, a low voltage signal is provided. Thus, the light reception unit 29 receives the scattered reflected light of the laser light projected to and scanned over the bar code label 3 and converts the received light into a voltage signal of the magnitude responsive to the light reception amount for output. The voltage signal generally is feeble and thus is hard to decode. Thus, the voltage signal is usually amplified to a binarization-possible proper value by the amplification unit 30. Based on the binarized signal provided by the binarization unit 32, the data processing unit 15 decodes the bar code and outputs the result. The processing of binarizing, decoding, etc., can use the currently known technology or technology developed in the future and therefore will not be discussed in detail.

Figure 7A:
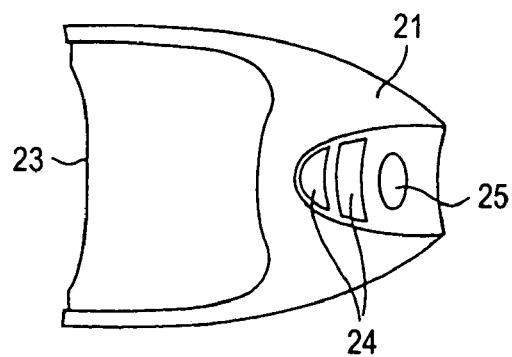
FIGS. 7A–C are schematic drawings to show the appearance of a gun-type tabletop type and/or hand-held type bar code reader.
Figure 7B:
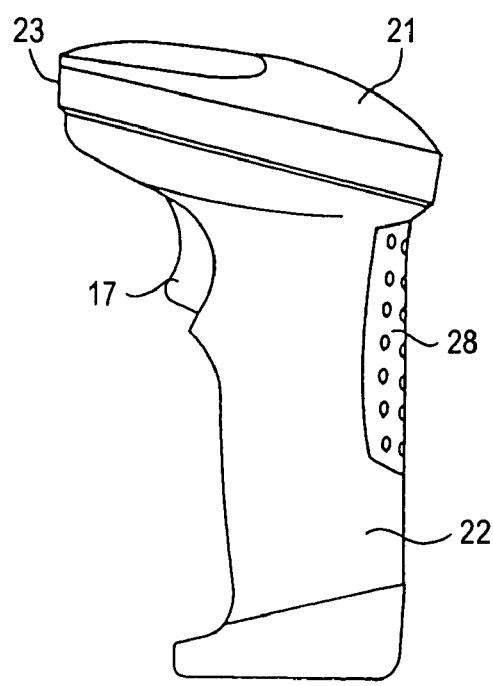
Figure 7C:
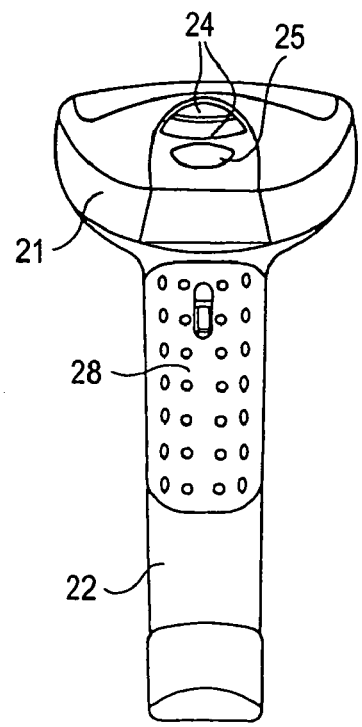

FIGS. 7A–C shows the appearance of the main unit of a gun-type tabletop type or hand held bar code reader as a bar code scanning device. FIG. 7A is a plan view of the bar code reader. FIG. 7B is a side view of the bar code reader. The FIG. 7C is a rear view of the bar code reader. The bar code reader shown in FIGS. 7A–C comprises a head section 21 and a handle 22 extended downward. The head section 21 is provided on the front with a projection section 23. The handle 22 is formed fully with pits and projections for the user to easily grasp the handle with one hand. A grip part 28 for preventing slip is disposed on the rear of the handle 22. To provide the slip prevention effect, preferably the grip part 28 is made of rubber and is formed on the surface with a plurality of projections.

A trigger switch 17 is provided in the vicinity of the boundary between the handle 22 and the head section 21. The trigger switch 17 is placed at a position where when the user takes hold of the handle 22, he or she can handle the trigger switch 17 with his or her forefinger or middle finger. The user pulls the trigger switch 17 like a trigger, whereby trigger unit is turned on and a trigger instruction is transmitted to the projection unit 16.

An LED display section 24 and a function switch 25 are placed on the top of the head section 21. The function switch 25 is placed at a position where when the user takes hold of the handle 22, he or she can handle the function switch 25 with his or her thumb. The function switch 25 is a pushbutton and can be turned on as the user presses the pushbutton from above with his or her thumb. When the function switch 25 is pressed, the switch unit 34 is switched and the operation for providing a predetermined function is executed. The function switch 25 may use a button that can be turned on/off like a toggle or canceled as the button is continuously pressed. The LED display section 24 is provided for the user to check the operation state of the bar code reader, and represents the operation state in a predetermined color, blinking, etc. For example, if the function switch 25 is continuously turned on for a predetermined time, the color is changed. Further, an effect sound, a voice guide may be added for enhancing the visual effect.

Since the invention is characterized by the fact that the bar code reader is provided with one or more function switches 25 to which any of functions can be assigned by user, the bar code reader is not limited to the shape in the embodiment and the formerly used form or a form developed in the future can be used whenever necessary.

In the embodiment, the example in which only one function switch 25 is provided as shown in FIGS. 7A–C is described, but the invention is not limited to the example, needless to say. For example, two or more function switches may be provided and the placement position is not limited to that in the embodiment. Various modes are possible in which the function switch is placed in parallel with a position on the rear of the bar code reader where the user handles the function switch with his or her thumb, or the function switch is placed on a side of the head section. The function switch may be placed in parallel downward or upward with the trigger switch so that a plurality of trigger-like switches are placed side by side, etc.

To assign any desired function to the function switch 25 by the user, a setting bar code is read. A dedicated bar code label is provided for each function. The user selects the setting bar code corresponding to the desired function from dedicated bar code labels. The selected setting bar code is then read through the bar code reader, whereby automatically the setting is changed. When the setting is changed correctly, the LED display section 24 blinks in blue, etc., for notifying the user that the setting has been changed. This method has the advantage that the setting can be changed extremely easily.

Figure 3:
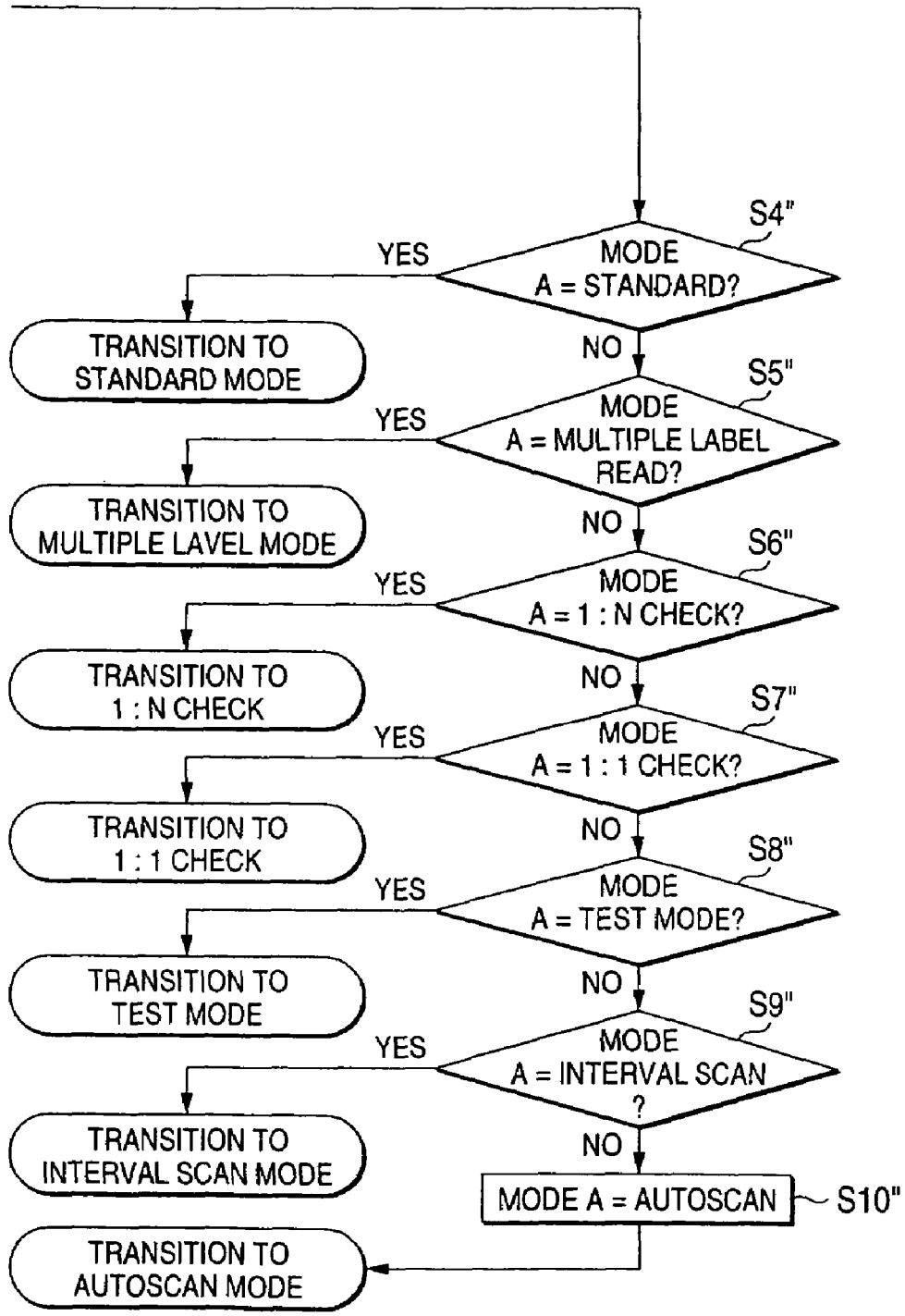
FIG. 3 is a flowchart continued from the flowchart in FIG. 2.
Figure 4:
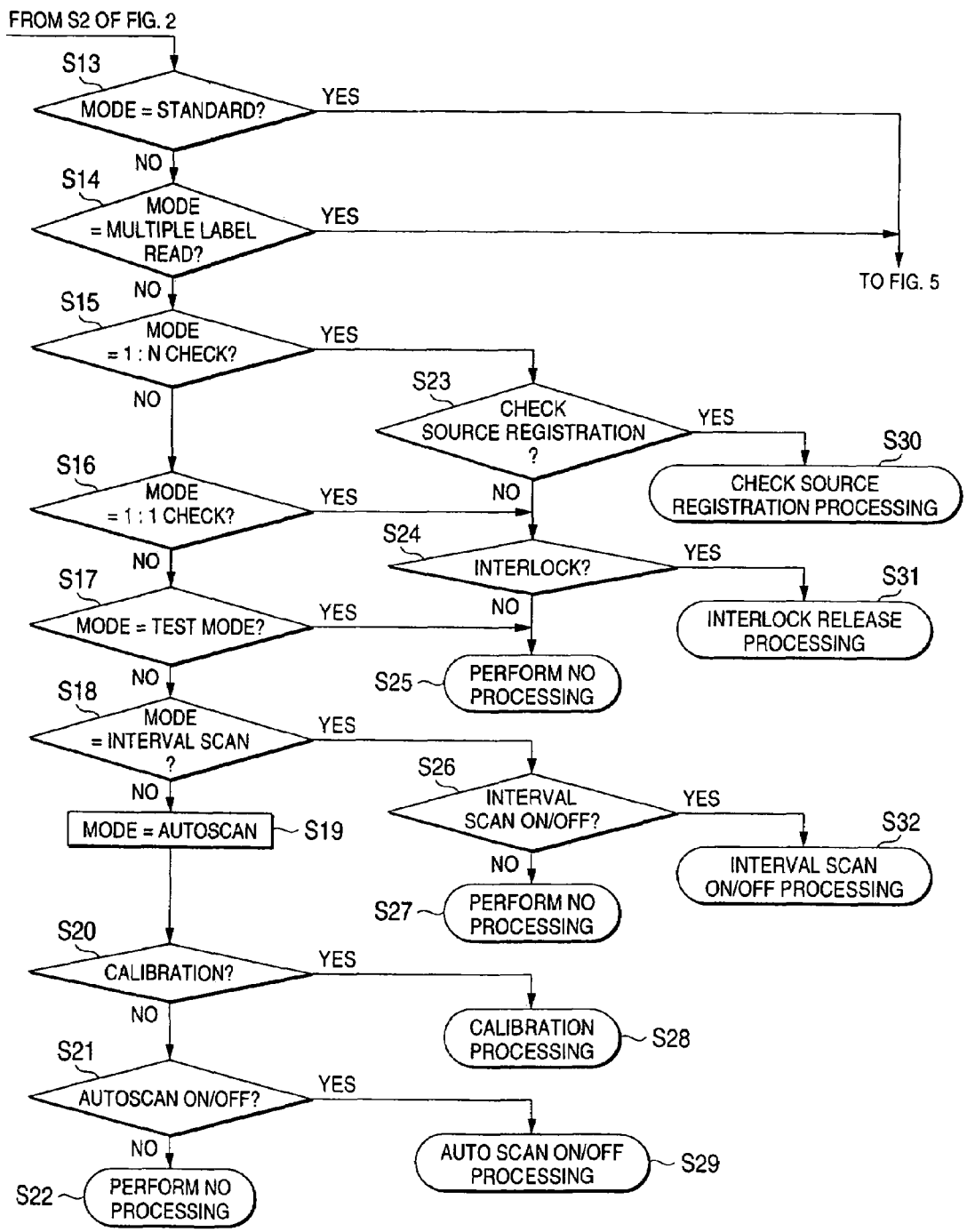
FIG. 4 is a flowchart continued from the flowchart in FIG. 2.
Figure 5:
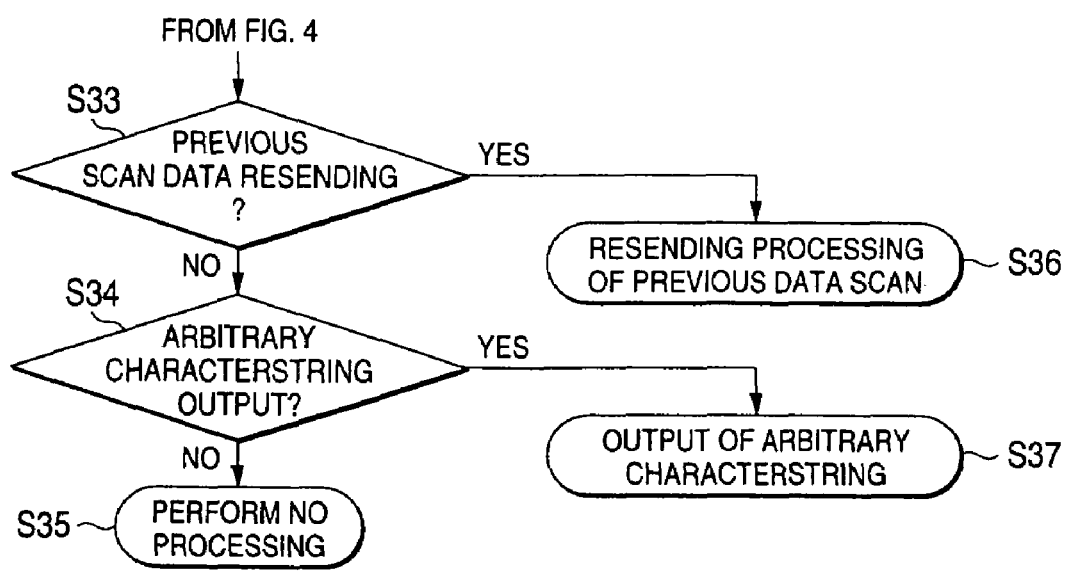
FIG. 5 is a flowchart continued from the flowchart in FIG. 4.
Figure 6:
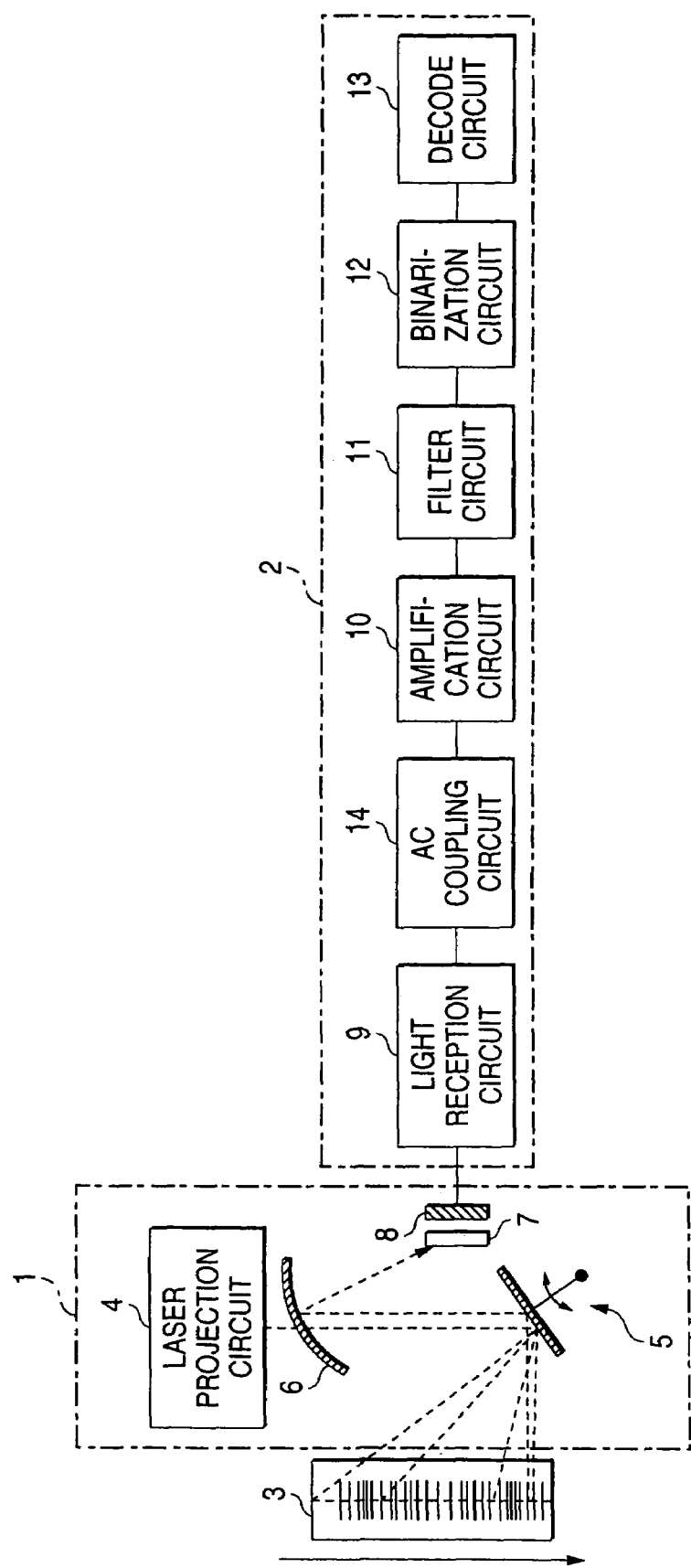
FIG. 6 is a block diagram to show the configuration of a bar code scanning device.

Alternatively, the bar code reader is connected to a computer through a serial interface such as RS-232C for placing them in a state in which data communications can be conducted, and setting is made by software in the computer. In this case, bar code reader setting software needs to be previously built in the computer. The connection between the bar code reader and the computer, as shown in FIG. 3, can be done with a condition of scanning data which can be received and sent between these or separately the bar code reader can be connected to the computer. For example, the connection between the bar code reader and the computer can be used by an exclusive line.

Further, the connection inferface between the bar code reader and the computer is not limited to RS-232C, it can be useful a serial connection, parallel connection like RS-422, IEEE1394, USB, Serial ATA or a network connection and optical connection like a 10BASE-T and 100BASE-TX. Furthermore, the connection is not limited to a cabled connection, it can be useful a radio wave or infrared light like a wireless LAN or bluetooth. In these methods, since it is not necessary for the bar code reader to provide any kind of physical hardware like a section switch or dip switch for setting each operation mode and function, it can be provided a simple structure of the bar code reader with reduction of the number of switch and restriction of the manufacturing cost of the bra code reader and it can be also reduced a mechanical trouble related to inferior mechanical contacting and frictional wear corresponding to mechanical movable points of the bar code reader. Especially, in case having a lot of selectable operation modes and functions, since it is not necessary to provide a lot of switches LEDs or LCDs as display portions for confirming the setup operation mode, operation function, the bar code reader can has a simple and compact external form with multiple functions including the operation modes and operation functions and the operation of the bar code reader can be simple.

[Function Assigned to Function Switch]

Any of various functions can be assigned to the function switch 25 in response to the specifications and the use mode of the bar code reader to be used. The functions adopted in the embodiment will be described later and switching each of the operation modes as the functions will be discussed with a flowchart. In the embodiment, a plurality of operation modes are preset in the bar code reader and the operation modes are switched by operating the function switch 25 and any desired functions are assigned to each operation mode. In the embodiment, the user previously specifies any desired three operation modes A, B, and C of the plurality of operation modes. For example, standard mode is specified as the operation mode A, multiple label read mode is specified as the operation mode B, and 1:N check mode is specified as the operation mode C.

In the embodiment, switching the operation mode and switching the operation function in each operation mode are conducted with the same function switch 25. Therefore, the mode transition and the operation function execution are distinguished from each other depending on the time of pressing the function switch 25.

[Switching the Operation Mode]

Figure 2:
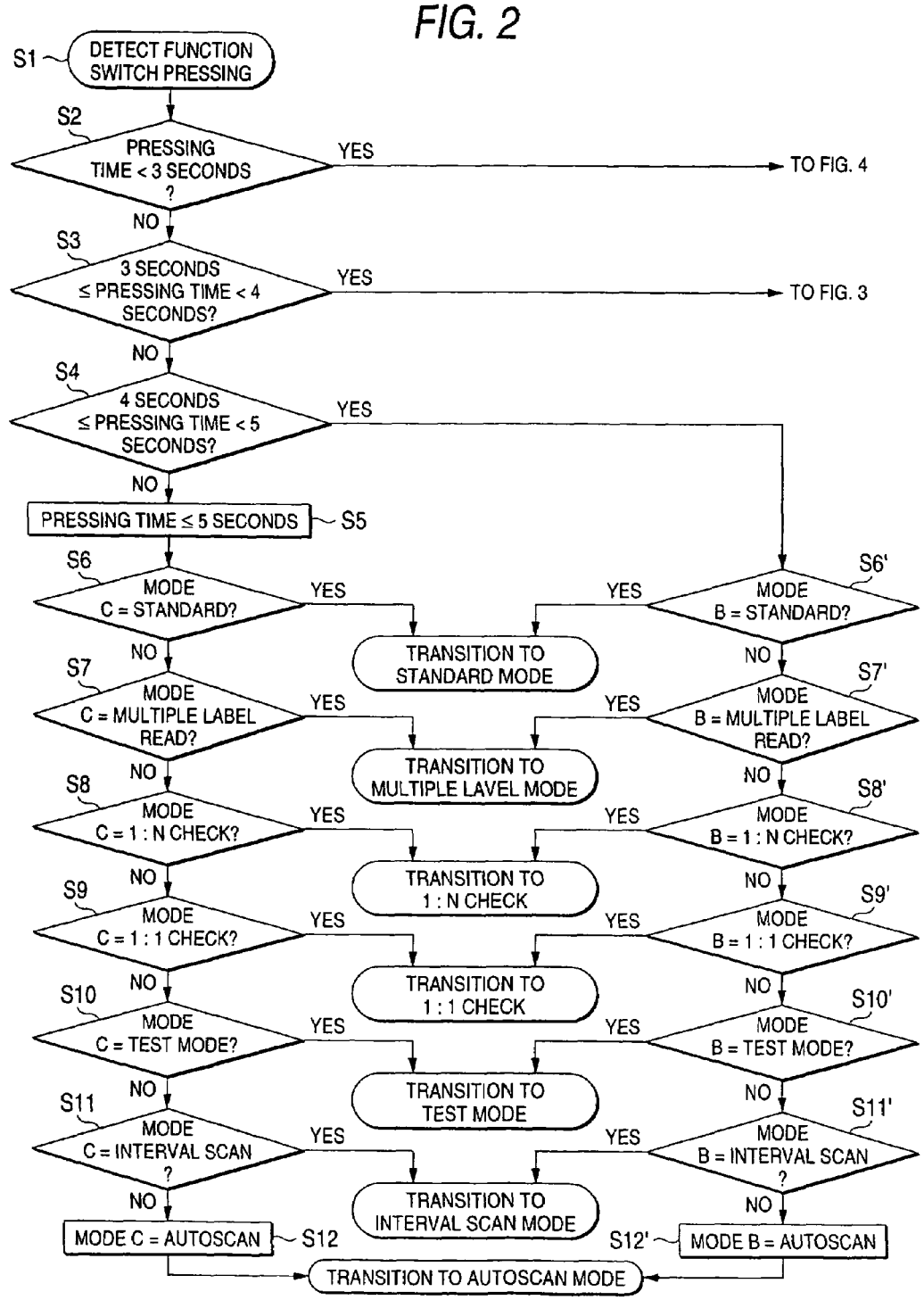
FIG. 2 is a flowchart to show how functions are switched depending on the time of pressing a function switch in the bar code scanning device in FIG. 1.

The operation mode transition is set depending on the time of pressing the function switch 25. As shown in FIG. 2, if the pressing time is, for example, within three seconds, the assigned operation function responsive to the current operation mode is executed.

If the pressing time of the function switch 25 becomes three seconds or more, the operation mode transition state is entered. For example, when the pressing time is three to four seconds, the transition is made to the operation mode A. When the pressing time is four to five seconds, the transition is made to the operation mode B. When the pressing time is five seconds or more, the transition is made to the operation mode C. The user can check on the LED display section 24 that the operation mode has been switched. For example, when the function switch 25 is pressed for three seconds, the LED display section 24 lights up in blue, enabling the user to check that the transition to the operation mode A has been made. Likewise, the operation mode selected at each point in time can be checked in such a manner that when the function switch 25 is pressed for four seconds, the LED display section 24 lights up in yellow and that when the function switch 25 is pressed for five seconds or more, the LED display section 24 lights up in red. Since they are taken as an example, the light color, the lighting manner, lighting, blinking, blinking time change, interval can be set arbitrarily. Alternatively, the transition time can be shortened or prolonged, needless to say.

Alternatively, as another embodiment, the transition may be made from the current operation mode to the next operation mode like a toggle. If the function switch 25 is pressed for three seconds or more, the operation mode transition state is entered and the operation mode is automatically switched to the next one each time when one second has elapsed like A to B to C to A to B to C . . . When the operation mode is switched to any desired operation mode, if the user releases the function switch 25, the current switched operation mode, or the desired operation mode is selected.

The operation modes will be discussed generally.

[Standard Mode]

The standard mode is a mode of scanning over one bar code label as one trigger. Therefore, when each bar code is read out, the data corresponding to the read out bar code is output.

[Multiple Label Read Mode]

In contrast, the multiple label read mode is a mode of scanning over two or more bar code labels, in which case multiple bar code labels are scanned and decoded as one trigger. Then, after the multiple bar code labels are scanned and decoded, the decoded data is output in a lump. The multiple bar code label read mode has a plurality of kinds. As a first type (Multi-1) of the multiple bar code label read mode, when a plurality of bar code labels are scanned with "On condition" of the trigger switch, first bar code is scanned and a header is added in front of the data corresponding to the read first bar code to be output. Then, after a second bar code is scanned, a separator character line is added in front of the data corresponding to the second bar code to be output. Finally, when the trigger switch is "OFF condition", the bar code reader is output a terminal as a signal to be complete the scan. In the above method, a space between the data and the next data become longer. However, it can be output the multiple bar code label as a series of data at the same time. Further, in case of a second type (Multi-2) of the multiple bar code label read mode, it can be scanned a plurality of bar code labels under "On condition" of the trigger switch and be output the decoded data. A different point of the second type (Multi-2) from the first type (Multi-1) is that the second type does not output immediately and stores at once after the scanning of a plurality of the bar code labels. The number of stored data is predetermined and when the stored number of the data becomes the predetermined number or the trigger switch is "OFF condition" from "ON condition", all of the stored data are output at the same time. Furthermore, in case of a third type (Multi-3) of the multiple bar code label read mode, it can be scanned the predetermined kind of a bar code under "ON condition" of the trigger switch. When the trigger switch is "OFF condition" from "ON condition", the scanned data is output at the same time with a predetermined data turn instead of the scanned data turn. The third type is useful for scanning a plurality of different types of bar codes. The kinds and digit number of bar codes read out by the bar code reader should be predetermined prior to scan.

[1:N Check Mode]

In the 1:N check mode, usually only the check operation is performed. Initially, the registration operation is performed for reading the data of the bar code label of the check source (that is, the bar code label to be checked) and storing the data as registered data. In the later scanning, whether or not each read data piece is the same as the registered data is checked. The registered data can also be updated whenever necessary as described later (registration/check switch operation). In the check mode, only the check result of true or false is output and in addition, the three types of data of the registered data, the checked data, and the check result data can also be output at the same time depending on the use mode. This mode is useful that the scanned bar code label is the same to the registered data of the bar code label whether or not to check the different product having the different bar code label as an alien substance in the product having the registered bar code label in the manufacturing line or the like.

[1:1 Check Mode]

In the 1:1 check mode, the check operation and the registration operation are repeated alternately. Initially, the registration operation is performed for reading the data of the bar code label of the check source and storing the data as registered data, and then the check operation is performed like those in the 1:N check mode. After such operations, the operation returns to the registration operation for updating the registered data. This means that the registered data of the check source is updated each time the check operation is performed. Therefore, the mode is useful to check with one to one that the scanned bar code label is the same to the registered bar code label whether or not to compare a bar code label on a payment slip with a bar code label of the corresponding product. In the 1:1 check mode, the check operation and the registration operation are repeated alternately in such a manner that the scanning at the odd'th time is the registration operation and the scanning at the even'th time is the check operation. However, if erroneous registration or check is made, again the same operation can be repeated (registration/check switch operation) as described later. Further, In additional function to the above case comparing the all data between the registered bar code label and the checked bar code label, there is another check function to compared a specified digit number of the registered bar code label with the same specified digit number of the scanned bar code label only. In case of the restriction of the specified digit number as the above described, the predetermined specified digit number is setup to the registered bar code and the scanned bar code.

[Test Mode]

In the test mode, the bar code label quality and the read performance of the bar code reader main unit are tested. For example, the test is conducted in a such a manner that scanning is performed 100 times and the number of times the bar code has been read normally is measured. Thus, it can be confirmed that the scanning operation of the bar code reader is stable whether or not by checking the scanning success ratio.

[Interval Scan (Automatic Consecutive Read) Mode]

In normal scanning, the trigger switch 17 is operated for scanning. In the interval scan mode, however, a beam is projected and consecutive scanning can be performed at given time intervals without handling the trigger switch 17. The interval scan mode is useful for consecutively scanning a plurality of bar codes.

[Autoscan (Automatic Detection Read) Mode]

In the autoscan mode, if the user does not operate the trigger, when a sensor, etc., detects a bar code at the read position of the bar code reader, automatically scanning is performed. Since it is not necessary to operate the trigger switch and it is possible to use the bar code reader main unit with a stand to fix on the predetermined position, it is not necessary for the user to hold the main unit. Further, since the laser beam for scanning the bar code label is worked as a sensor for detecting the bar code label existence at a predetermined position, the scanning of the bar code label is started automatically corresponding to the detection of the bar code label at the predetermined position.

[Operation Function Assignment to Function Switch]

In the described operation modes, the user can assign a separate operation function to each operation mode. A common operation function can also be assigned independently of the operation mode. As the method of assigning any desired operation function to the function switch 25 of the bar code reader by the user, the method of scanning over the setting bar code as described above or the method of externally entering an instruction in the bar code reader through RS-232C, etc., is available. The operation functions to be assigned are, for example, as follows: Further, each of the operation functions described hereinafter is an additional function to improve the bar code reader function at each mode.

1. Operation Mode Transition

As the function switch 25 is pressed, the operation mode is switched. In this case, the function switch 25 functions only as an operation mode changeover switch independently of the pressing time of the function switch 25. When this operation mode switching is carried out, the function switch 25 is operated as the operation mode selection switch to select the desired operation mode from among the registered operation modes in the memory unit 33.

2. Trigger Switch

In addition to the original trigger switch 17, the same function as the trigger switch 17 can also be assigned to the function switch 25. In this case, it is made possible to operate the trigger from either the trigger switch 17 or the function switch 25. As another embodiment, the original trigger switch 17 can also be made to function as a function switch to which a function can be assigned. In this case, as a rule, any one of the two or more function switches is provided with the function of the trigger switch. For example, in FIGS. 7A–C, the function switch 25 is used as the trigger switch and another function is assigned to the trigger switch 17 so that the operation functions of the switches can be replaced for use.

3. Data Transmission Start Trigger

Usually, when the bar code reader reads data, automatically the read data is transmitted. However, Transmitting the data can also be prevented until an instruction to transmit data is given. In this case, the data is not transmitted until a data transmission start trigger is entered. Thus, when the function switch 25 is operated and a data transmission start trigger is entered, the data is transmitted. In other words, the read data is not transmitted unless the function switch 25 is pressed. This operation function can be used to check data, select data to be not transmitted, etc. For example, if data to be not transmitted is scanned by mistake, desired data is again read and then the function switch 25 is pressed for transmitting the data.

4. Resending the Previous Scan Data

This function is to resend the same data as the previously read scan data. It is a convenient function for the case where it is necessary to scan over the same type of commodity more than once. For example, if more than one commodities of the same type are purchased in a convenience store, etc., the function switch 25 may be pressed as many times as the number of the commodities without repeating scanning. In the present embodiment, as shown in FIG. 9, this function; "Resending the previous scan data" can be selectable operation function, when the user selects and memorizes either "Standard mode", "Multiple label readmode (Multi-2) "or" Multiple label read mode(Multi-3)".

5. Sending a Setup Arbitrary Character String

This operation function is to transmit a predetermined character string preset by the user. For example, often used commodity data is stored or presetting is made so as to perform predetermined operation when the host computer or application software receives a predetermined character string, and the operation function can be used as a start condition. The preset of the character string is carried out by the above described preset bar code or the computer connected to the bar code reader. In this embodiment, as shown in FIG. 9, this function; "Sending a setup arbitrary character string" can be selectable operation function, when the user selects and memorizes either "Standard mode", "Multiple label read mode(Multi-2)" or "Multiple label read mode (Multi-3)". Further, when the function key 25 is only one as shown in this embodiment and the user selects the operation function; "Resending the previous scan data" as the selected operation function to the function key 25, the user can not use this operation function; "Sending a setup arbitrary character string" at the same time.

6. Registration and Check Switch in 1:N Check Mode

This function is to switch between the registration operation and the check operation in the 1:N check mode described above. As described above, in the 1:N check mode, basically only the check operation of the read data against the registered data is performed. However, to update the registered data of the check source, the operation function can be used to make the transition to the registration operation. In this case, if the function switch 25 is pressed, the check operation is switched to the registration operation.

7. Registration and Check Switch in 1:1 Check Mode

This function is to switch between the registration operation and the check operation in the 1:1 check mode described above. As described above, in the 1:1 check mode, the registered data of the check source and the read data change each time and thus the registration operation and the check operation are repeated alternately. However, if the registration or check operation is erroneous or unnecessary data is scanned or the user does not want to perform the registration or check operation on the next data, the user might want to repeat the same operation once more. If the operation function is used in such a case, switching is not conducted between the registration operation and the check operation and the same operation as the previous operation is repeated, so that desired scanning can be again performed. Since the function can be used to again register the registered data from the beginning, it can also be called registration/check operation temporary cancel function. The function differs from the function of registration and check switch in 1:N check mode described above in which a return operation is made to after the check operation.

8. Interlock Release Function in 1:N Check Mode

Usually, every read data is automatically transmitted and the operation of read, transmission, etc., at the next stage is not interrupted. When an error of check NG, etc., occurs, the interlock function is to lock the operation for disabling the later operation of read, etc., until the lock is released.

When interlock is not applied, if an error or trouble occurs in read, it does not interfere with the operation itself of the bar code reader and the operation is continued. Thus, if an error occurs, the user is not aware of it or easily overlooks it. If interlock is applied, when anomaly occurs, immediately the trigger does not work and thus user's attention can always be called to the anomaly. On the other hand, at the interlock operation time, the interlock mode needs to be released to restart the operation. The operation function plays a role of a release key. If the function switch 25 assigned the operation function is pressed, the interlock mode is released.

9. Interlock Release Function in 1:1 Check Mode

The interlock release function when the interlock operation is performed in the 1:1 check mode is assigned in a similar manner to that described above.

10. Switch to Autoscan

So-called hand-free operation mode of automatically projecting light of a laser, etc., rather than the normal operation of operating the trigger switch 17 by the user taking hold of the bar code reader includes autoscan of detecting a bar code and starting scanning, interval scan of repeating scanning at predetermined time intervals as described above, and the like. The switch to autoscan functions as a switch for turning on/off such autoscan operation.

11. Calibration Trigger in Autoscan Mode

This operation function is to measure the reflected light amount in a state in which no bar code exists and calibrate so as to make possible reading in the optimum state. In the autoscan mode, the read object is placed at the scan position of the bar code reader, whereby the presence or absence of a bar code is detected by a sensor, etc., and scanning is started. Therefore, to check the presence of a read object, it is necessary to previously measure the reflected light amount when no read object exists, namely, when only the background exists. The operation function is to execute calibration with the reflected light amount on the background as the reference to calibrate the measurement reference value. When the function switch 25 setup to calibration trigger mode is pressed without any bar code, the execution of the calibration (gain teaching) is informed by either sound by a buzzer or lighting of LED display. When the calibration is started, it is executed an sensitivity adjustment by a detection of the background reflection ratio. The adjusted sensitivity value is stored. In general, it becomes higher scanning ratio corresponding to larger difference of the sensitivity between the scanned bar code label and the background. During the calibration, the LED display is light-on. When the calibration is completed, the buzzer makes sound and the LED display is light-off.

12. Setting Bar Code Read Trigger of Bar Code Reader

To change the function assignment to the function switch 25 or any other bar code reader setting, various means for externally inputting through RS-232C, etc., are available. The method of reading a dedicated setting bar code, thereby changing to any desired setting is easy and convenient. In this case, it is necessary to distinguish usual bar code read from setting bar code read of bar code reader. The operation function is a trigger to start the setting bar code read. To avoid trouble of changing setting if a general bar code and a setting bar code are the same, the usual scan mode and the setting bar code scan mode are switched explicitly.

However, it is also possible to automatically switch to the setting bar code scan mode if a setting bar code is read. In this case, the code type, the number of characters, etc., of a setting bar code is specified for distinguishing the setting bar code from a general bar code. Further, for example, LED display, a voice guide, an effect sound, etc., informs the user that the usual scan mode has been switched to the setting bar code scan mode.

[Operation Functions that Can be Set in Operation Modes]

The described operation functions are classified into those that can be set in the operation modes, those effective only for a predetermined operation mode, and common operation functions set independently of the operation mode. In FIG. 9, it is described one preferred example of the correspondence between the operation modes and the operation functions. However, the other examples of the correspondence between the operation modes and the operation functions that can be assigned thereto are given below:

The operation functions of operation mode transition, setting bar code read trigger of bar code reader, etc., can be assigned to the operation modes as common operation functions.

The standard mode can be assigned the functions of data transmission start trigger, resending the previous scan data, sending a setup arbitrary character string, etc. In addition, it maybe assigned the trigger function.

The multiple label read mode can also be assigned the functions of data transmission start trigger, resending the previous scan data, sending a setup arbitrary character string, etc. In addition, it may be assigned the trigger function.

The 1:N check mode can be assigned the functions of registration and check switch in 1:N check mode, interlock release function in 1:N check mode, etc. In addition, it may be assigned the trigger function.

The 1:1 check mode can be assigned the functions of registration and check switch in 1:1 check mode, interlock release function 1:1 check mode, etc. In addition, it may be assigned the trigger function.

In the embodiment, the test mode is not assigned a particular function. It may be assigned the trigger function and/or the mode transition.

The interval scan mode can be assigned the functions of interval scan on/off switch, etc.

The autoscan mode can be assigned the functions of autoscan on/off switch, calibration trigger in autoscan mode, etc.

The operation functions are stored in the memory unit 33 with which the bar code reader is provided as a table in response to the pressing time of the function switch 25, the operation mode, etc. The table is referenced in response to each operation mode for calling any desired operation function and the operation function is executed.

Of course, the operation functions can be assigned arbitrarily and it is also possible to assign no operation function as specified by the user. In this case, if the function switch 25 is operated, no operation is performed. On the other hand, it is also possible to assign a common operation function to some or all of the operation modes. Further, it is also possible to set only one or two operation modes or four or more operation modes and it is also possible to assign an operation function to the function switch 25 only in a specific operation mode.

FIGS. 2 to 5 are flowcharts to show an operation flow example when the function switch 25 is pressed. Here, it is assumed that the operation modes A, B, and C and the operation function assignment to the function switch 25 in response to each operation mode are set by the user according to the embodiment described above. As shown in FIG. 2, at S1, the pressing time of the function switch 25 is measured and the step to which the process jumps is determined in response to the pressing time. If the pressing time exceeds five seconds, the process goes to S6 through S2, S3, S4, S5 and the operation mode makes the transition to the mode C. At S6 to S12, the transition is made to a predetermined operation mode in accordance with which operation mode the mode C is set to.

On the other hand, when the pressing time is between four and five seconds, S4 returns YES and the process jumps to S6'. In this case, the operation mode makes the transition to the mode B and thus the contents of the mode B preset by the user are referenced in the memory unit 33 in a similar manner to that described above and at S6' to S12', the transition is made to the corresponding operation mode.

When the pressing time is between three and four seconds, in FIG. 2, S3 returns YES and the process jumps to S4" in FIG. 3. In the process, the operation mode makes the transition to the mode A and thus the contents of the mode A set by the user are referenced in the memory unit 33 in a similar manner to that described above and at S4" to S10", the transition is made to the corresponding operation mode.

Further, when the pressing time of the function switch 25 is shorter than three seconds, no operation mode transition is made and the assigned operation function in response to the current operation mode is executed. In FIG. 2, S2 returns YES and the process jumps to S13 in FIG. 4. At S13 to S19, the current operation mode is checked. At S20 to S37 shown in FIGS. 4 and 5, which of the operation functions that can be set in response to each operation mode is selected is determined and the selected operation function is executed.

In the flowcharts, whether or not the correspondence is applied is determined for all operation modes and operation functions. However, only preset operation modes and the operation functions responsive to each operation mode may be programmed and the assigned operation function may be executed in response to the pressing time of the function switch 25.

The optical information reader and the optical information reading method according to the present invention have the advantage that the desired operation function can be called by performing simple operation. That is why the optical information reader and the optical information reading method comprise the switch unit for enabling the user to assign any desired operation function. Particularly, the user can call any desired preset function simply by pressing the function switch placed on the bar code reader main unit, so that the user can conveniently use the bar code reader fitted for the use mode of the user. If the operation function assigned to the switch is fixed as in the related art, the bar code reader can cover only a single use mode and cannot cover any other function if the operation function is required. The invention provides the environment in which the user can assign the optimum operation function as desired in response to the use mode, thereby increasing the convenience of the user.

What is claimed is:

1. An optical information reader comprising:
   a trigger means for instructing to start reading data in a read object;
   a decode means for receiving a reflected light from the read object and decoding the data in the read object;
   a user-selectable function switch capable of executing a function different from that of the trigger means;
   a memory storing at least one read operation mode in which data decoded by the decode means is outputted, a previous data resending function, an arbitrary character string sending function for sending a predetermined character string as a selectable function, and at least one check operation mode for checking the data decoded by the decode means by comparing the decoded data with a registered data, wherein the registered data is a result of reading the read object, and outputting a check result,
   wherein when an operation mode is selected from a plurality of read operation mode and check operation mode which are stored in the memory and a function corresponding to a selected operation mode is selected and the selected operation mode and the function are set to the optical information reader, a starting function of the selected operation mode is assigned to the trigger means and the function corresponding the selected operation mode is assigned to the function switch.

2. The optical information reader according to claim 1, wherein the at least one read operation mode stored in the memory includes a manual trigger mode in which the at least one read operation mode is operated by the trigger means, or an automatic trigger mode.

3. The optical information reader according to claim 2, wherein the at least one read operation mode stored in the memory includes an automatic detection read mode to determine if the read object is detected wherein the automatic detection read mode detects the read object by measuring the reflected light from the read object and automatically executes the at least one read operation.

4. The optical information reader according to claim 2, wherein the at least one read operation mode stored in the memory includes an automatic read mode which automatically executes at predetermined times.

5. The optical information reader according to claim 1, wherein said memory includes a memory unit storing selected operation modes from all operation modes stored in the memory, and the function switch includes an operation mode switching function to further select a mode from the memory unit.

6. The optical information reader according to claim 5, wherein the selected function and a change of the operation mode is determined by pressed time of the function switch.

7. The optical information reader according to claim 6, wherein when the pressed time of the function switch is shorter than a predetermined time, the selected function is executed and when the pressed time of the function switch is longer than the predetermined time, the selected operation mode is changed.

8. The optical information reader according to claim 1, wherein the read operation mode stored in the memory includes a single read object read mode, wherein a single read object is read, and a multiple read object read mode, wherein a plurality of read objects are read.

9. The optical information reader according to claim 8, wherein the multiple read object read mode includes a first multiple read object read mode for outputting a first read data after reading a first read object and then outputting a second read data after reading a second read object, and a second multiple read object read mode for outputting the first and the second read data group of data after reading the first read object and then reading the second read object.

10. The optical information reader according to claim 8, wherein the multiple read object read mode includes reading a plurality of read objects during an on-condition of the trigger means, and outputting a plurality of read data after the trigger means is set to an off-condition.

11. The optical information reader according to claim 1, wherein the memory includes a test mode for testing a read performance of the optical information reader, the read operation mode, and the check operation mode.

12. The optical information reader according to claim 11, wherein the test mode includes performing a plurality of number of read operations and then measuring the number of times the read object has been read normally.

13. The optical information reader according to claim 1, wherein the operation mode to be selected as a function of the optical information reader in the plurality of read operation modes and check operation mode stored in the memory and the function assigned to the function switch are selected by means of a data communication with a computer connected to the optical information reader and set in the optical information reader.

14. The optical information reader according to claim 1, wherein the operation mode to be selected as a function of the optical information reader in the plurality of read operation modes and check operation mode stored in the memory and the function assigned to the function switch are selected by reading a bar code which sets an operation mode and a function, wherein the bar code corresponds to the operation mode to be selected for the optical information reader and the function assigned to the function switch.

15. The optical information reader according to claim 1, wherein the read operation mode includes a plurality of read operation mode, each having a different reading time for the read object or a different number of reading operation.

16. The optical information reader according to claim 1, wherein the check operation mode stored in the memory further includes a second check operation mode in which a registration mode for registering a data and a check operaincludes a first check operation mode in which after executing a registration operation for registering a data, a check operation for checking the registered data and the read data is continuously repeated.

17. The optical information reader according to claim 16, wherein the check operation mode stored in the memory tion for checking the registered data and the read data are alternately repeated.

18. A method for reading optical information comprising:
instructing, by a trigger means, to start reading a set of data in a read object;
receiving a reflected light from the read object and decoding the data in the read object;
executing a user-selectable function switch which includes a function different from the trigger means;
storing in a memory at least one read operation mode, in which the data decoded is outputted; a previous data resending function; an arbitrary character string sending function for sending a predetermined character string as a selectable function, and at least one check operation mode for checking the data decoded;
wherein when an operation mode is selected from a plurality of read operation mode and check operation mode which are stored in the memory and a function corresponding to a selected operation mode is selected and the selected operation mode and the function are set to the optical information reader, assigning a starting function of the selected operation mode to the trigger switch and assigning the function corresponding to the selected operation mode to the function switch.

19. The method of claim 18, further comprising operating the at least one operation mode stored in the memory by a manual trigger mode or an automatic trigger mode.

20. The method of claim 19, comprising determining if the read object is detected by measuring the reflected light from the read object and automatically executing the at least one read operation.

21. The method of claim 19, further comprising executing an automatic read mode at predetermined times.

22. The method of claim 18, further comprising storing a selected operation modes in a memory unit from all operation modes stored in the memory, and further selecting a mode from the memory unit by the function switch which includes an operation mode switching function.

23. The method of claim 22, further comprising determining the selected function and a change of the operation mode by pressed time of the function switch.

24. The method of claim 23, executing a selected function by having the pressed time of the function switch shorter than a predetermined time, and changing the selected operation mode by having the pressed time of the function switch longer than the predetermined time.

25. The method of claim 18, further comprising reading a single read object in a single read object read mode and reading a plurality of read objects in a multiple read object read mode.

26. The method of claim 25, comprising outputting a first and a second read data as a group of data after reading a first read object and then reading a second read object.

27. The method of claim 25, wherein the multiple read object read mode includes reading a plurality of read objects during an on-condition of the trigger means, and outputting a plurality of read data after the trigger means is set to an off-condition.

28. The method of claim 18, further comprising testing a read performance of the optical information reader by a test mode.

29. The method of claim 28, wherein the test mode includes performing a plurality of number of read operations and then measuring the number of times the read object has been read normally.

* * * * *

UNITED STATES PATENT AND TRADEMARK OFFICE
CERTIFICATE OF CORRECTION

PATENT NO. : 6,978,938 B2
DATED : December 27, 2005
INVENTOR(S) : Tsunobuchi et al.

It is certified that error appears in the above-identified patent and that said Letters Patent is hereby corrected as shown below:

Column 19,
Lines 58-65, should read as follows:
-- The optical information reader according to claim 1, wherein the check operation mode stored in the memory includes a first check operation mode in which after executing a registration operation for registering a data, a check operation for checking the registered data and the read data is continuously repeated. --.

Column 19, line 66 - Column 20, lines 1-2,
should read as follows:
-- The optical information reader according to claim 16, wherein the check operation mode stored in the memory further includes a second check operation mode in which a registration mode for registering a data and a check operation for checking the registered data and the read data are alternately repeated. --.

Signed and Sealed this

Twenty-first Day of March, 2006

JON W. DUDAS
*Director of the United States Patent and Trademark Office*